United States Patent [19]

Morikawa

[11] Patent Number: 5,783,218
[45] Date of Patent: Jul. 21, 1998

[54] MECHANISM FOR POWDERING BREAD DOUGH BEING STRETCHED

[75] Inventor: Michio Morikawa, Utsunomiya, Japan

[73] Assignee: Rheon Automatic Machinery Co., Ltd., Tochigi-ken, Japan

[21] Appl. No.: 918,908

[22] Filed: Aug. 27, 1997

[30] Foreign Application Priority Data

Sep. 2, 1996 [JP] Japan .................. 8-250969

[51] Int. Cl.$^6$ ...................................... A21C 3/02
[52] U.S. Cl. .................. 425/101; 425/363; 425/373; 426/502; 426/504; 426/517
[58] Field of Search ...................... 425/101, 107, 425/363, 373; 426/502, 504, 517

[56] References Cited

U.S. PATENT DOCUMENTS

| | | | |
|---|---|---|---|
| 2,633,242 | 3/1953 | Rhodes | 425/101 |
| 2,666,398 | 1/1954 | Crendler et al. | 425/101 |
| 3,973,895 | 8/1976 | Hayashi | 425/101 |
| 4,056,346 | 11/1977 | Hayashi | 425/101 |
| 4,192,636 | 3/1980 | Hayashi et al. | 425/373 |
| 4,555,226 | 11/1985 | Benier | 425/101 |
| 4,731,008 | 3/1988 | Hayashi | 425/373 |
| 4,770,619 | 9/1988 | Rijkaart | 425/101 |
| 5,106,636 | 4/1992 | Ban et al. | 426/502 |

FOREIGN PATENT DOCUMENTS 54-991 8/1975 Japan .

*Primary Examiner*—Khanh P. Nguyen
*Attorney, Agent, or Firm*—Limbach & Limbach L.L.P.

[57] ABSTRACT

An apparatus for stretching bread dough into a sheet is provided, wherein a plurality of conveying rollers are supplied with powder so as to stretch the bread dough without its adhesion to the rollers. To have powder adhere to a plurality of conveying rollers, a powder-supply conveyor belt is made to abut the lower surfaces of the rollers.

6 Claims, 4 Drawing Sheets

MECHANISM FOR POWDERING BREAD DOUGH BEING STRETCHED

FIELD OF THE INVENTION

This invention relates to a mechanism for supplying powder used in a bread-dough stretching apparatus, and in particular to providing a simple mechanism wherein the bread dough being stretched is prevented from adhering to the apparatus during the stretching process.

PRIOR ART

As is shown in Japanese Patent Publication No. 54-991, the powder-supply means for the conventional stretching apparatus comprises a conveying device having a plurality of belt conveyors arranged in series such that the leading end of one of two adjacent conveyors is put above the trailing end of the other conveyor so that powder is delivered therebetween.

However, when the plurality of belt conveyors of the conveying device are replaced by a plurality of rollers to stretch bread dough, sufficient powder cannot be delivered between the rollers, the bread dough being stretched adheres to the rollers, and the stretching operation sometimes needs to be stopped. Thus, the conventional stretching apparatus using rollers can often be a problem when being used for a continuous operation.

SUMMARY OF THE INVENTION

This invention, aiming to solve the above-mentioned problems, comprises a conveying device having a first plurality of rollers and a second roller mechanism disposed above the first plurality of rollers. It is characterized by a powder-supply conveyor belt, made to abut the lower surfaces of the first plurality of rollers of the conveying device, for supplying powder to the bread dough being stretched.

DESCRIPTION OF THE PREFERRED EMBODIMENTS

In this invention a powder-supply conveyor belt is made to abut and rotate along the lower surfaces of the conveying rollers in a stretching apparatus so that powder is made to adhere to the conveying rollers.

Figure 1:
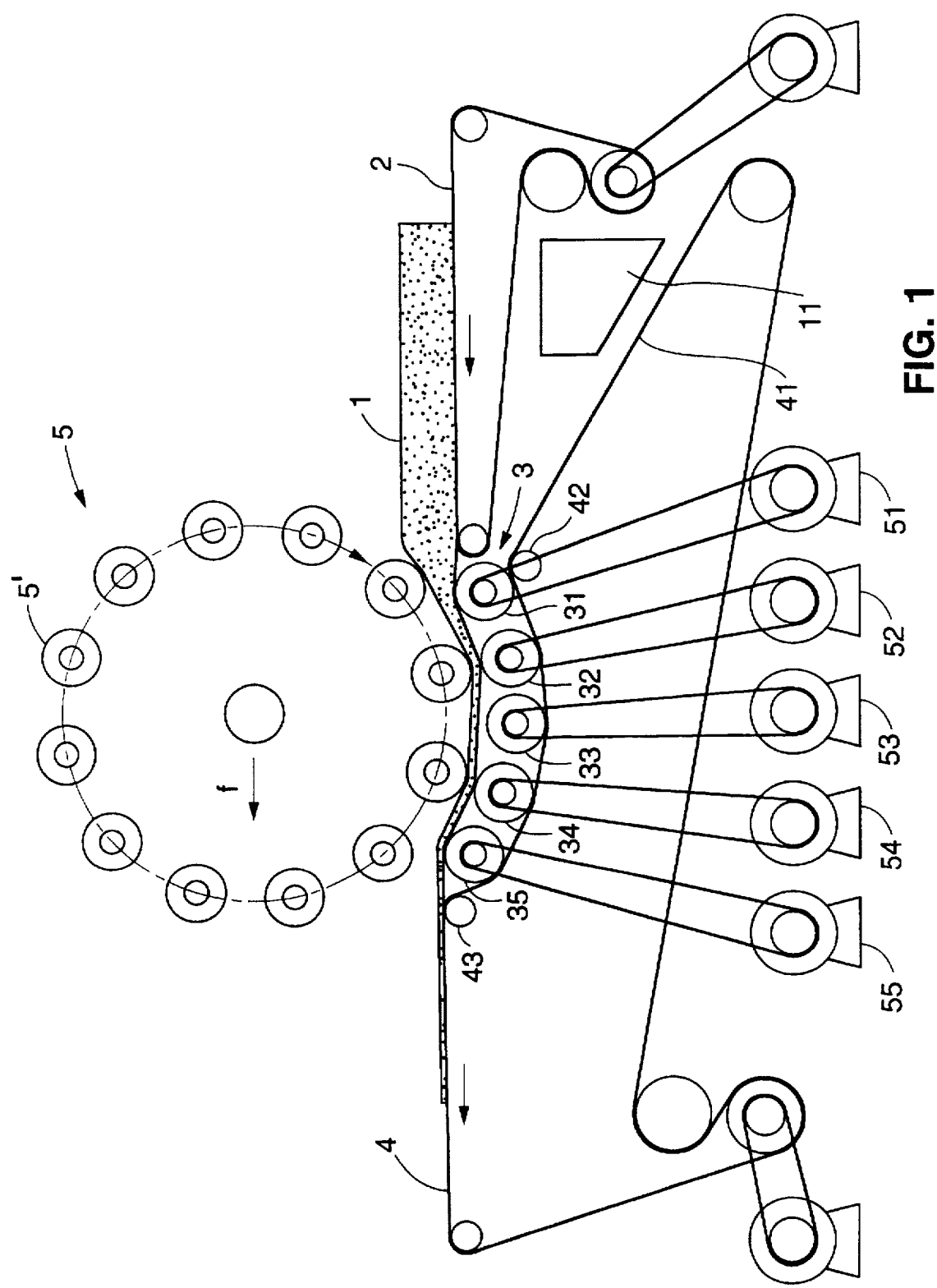
FIG. 1 is an entire side view showing a first embodiment of this invention.

A first embodiment of this invention will now be described by reference to FIGS. 1 and 2. In it a supply conveyor 2 for supplying bread dough 1 is disposed at the inlet of a conveying device 3, comprising a plurality of conveying rollers 31-35, and a discharge conveyor 4 is disposed at the outlet of the conveying device 3.

A roller mechanism 5, wherein a plurality of planetary rollers 5' revolve along a circular orbit, is disposed above the conveying device 3. The planetary rollers 5' are freely and rotatably fit in shafts 6 fixed to a wheel 7. The planetary rollers 5' revolve substantially parallel to the conveying device where they face each other.

The wheel 7 is fixed to a drive shaft 8 that is supported by a frame 12, and the wheel 7 is rotated by a motor 10 via a gear 9 mounted on the drive shaft 8.

A powder-supply conveyor belt 41 is a part of the conveyor belt of the discharge conveyor 4 and extends upstream below and farther than the conveying device 3, while its upper surface abuts the lower surfaces of the conveying rollers 31-35. The powder-supply conveyor belt 41 is supported by rollers 42 and 43 of the discharge conveyor 4 adjacent to the conveying rollers 31-35 so as to cause the conveyor belt 41 to press the conveying rollers upward.

Powder-supply means 11 is provided at an upstream end of the discharge conveyor 4 and is arranged to sprinkle powder onto the conveyor belt 41. Any conventional powder-supply means 11 may be used that attains this purpose.

The conveying device 3 may be disposed such that the distance or space between an imaginary circular arc as depicted by the envelope of the planetary rollers 5' and that of the conveying rollers 31-35 decreases as bread dough moves from the upstream roller 31 to the downstream roller 35.

The conveying rollers 31-35 are driven by their respective motors 51-55 through drive shafts so as to rotate in a downstream direction. The number of revolutions of each of the motors 51-55 can be adjusted separately by a controller (not shown) such as an inverter, so that the increase in the rotational speeds of the rollers 31-35 can be adjusted in the downstream direction, and thus bread dough is stretched in accord with the properties of the dough.

In this embodiment the conveying rollers 31-35 are made to rotate so that their rotational speeds increase in the traveling direction. The rate of increase of the rotational speed of the rollers 31-35 is made to be inversely proportional to that of the decrease in the space between the planetary rollers 5' and the conveying rollers 31-35.

The rate of decrease of the space, namely, the compression ratio, can be increased by rotating a handle 18 in the direction shown by the arrow f.

The speed of the supply conveyor 2 is set to be the same as or less than that of the conveying roller 31, and the speed of the discharge conveyor 4 is set to be the same as or faster than that of the conveying roller 35.

Figure 2:
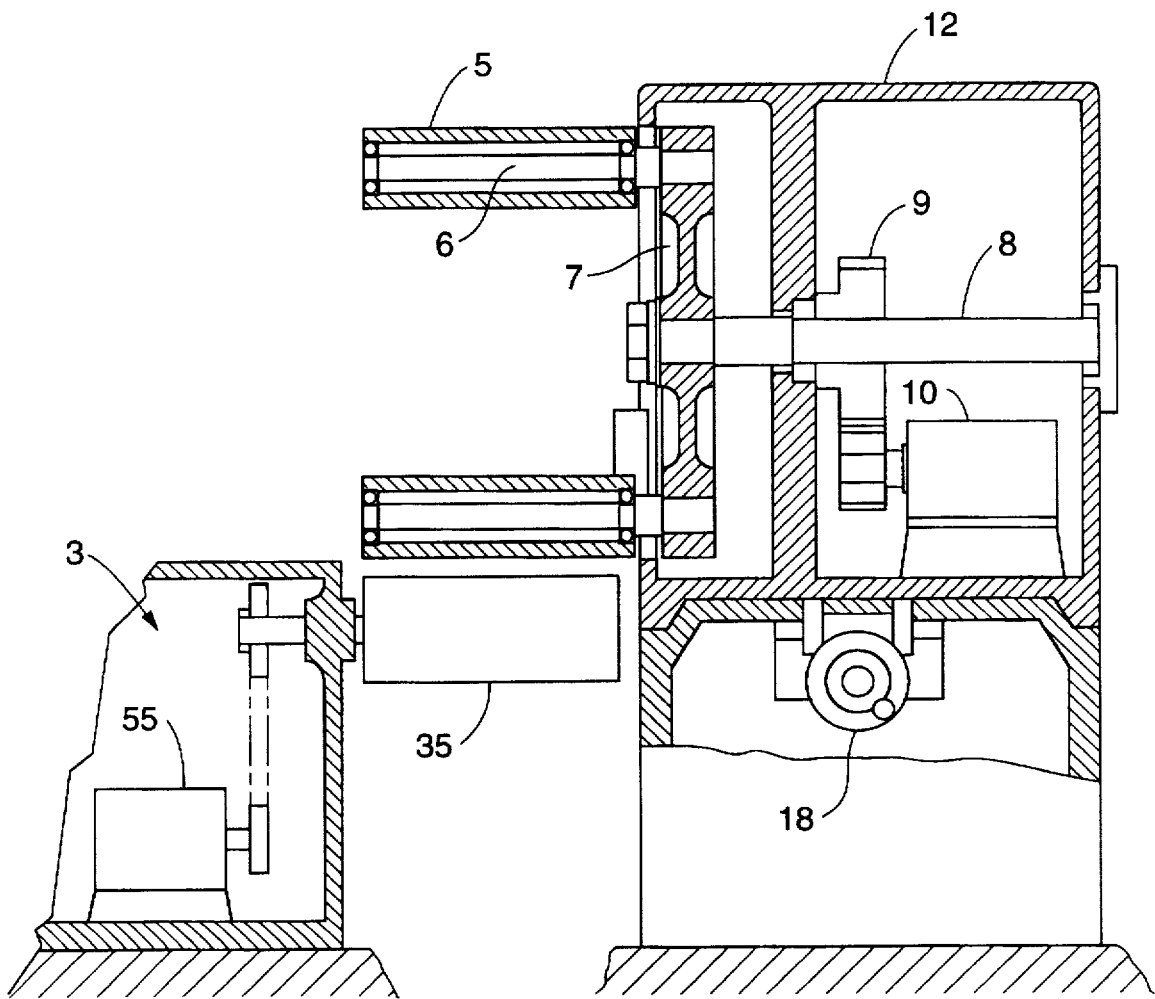
FIG. 2 is a sectional front view of the first embodiment of this invention.
Figure 3:
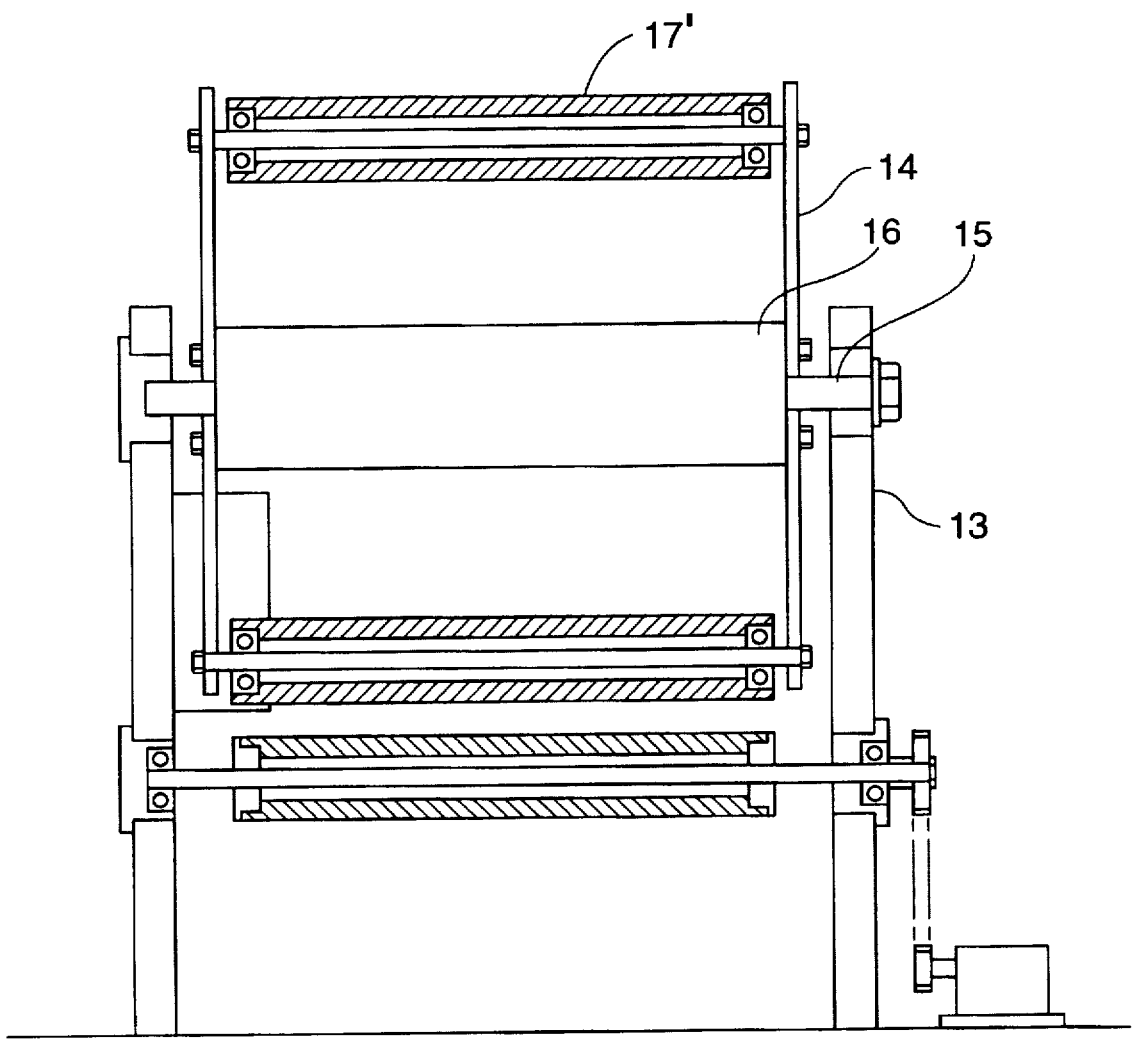
FIG. 3 is a sectional front view of a second embodiment of this invention.

In a second embodiment (shown in FIG. 3), each of the planetary rollers 17' is supported at both its ends, as opposed to the structure of FIG. 2 wherein these rollers 5' are cantilevered. A rotary wheel 14 is supported by a frame 13, a motor pully 16 is mounted on a main shaft 15 of the wheel 14, and the planetary rollers 17' are caused to revolve by the rotational drive of the motor pulley 16.

Figure 4:
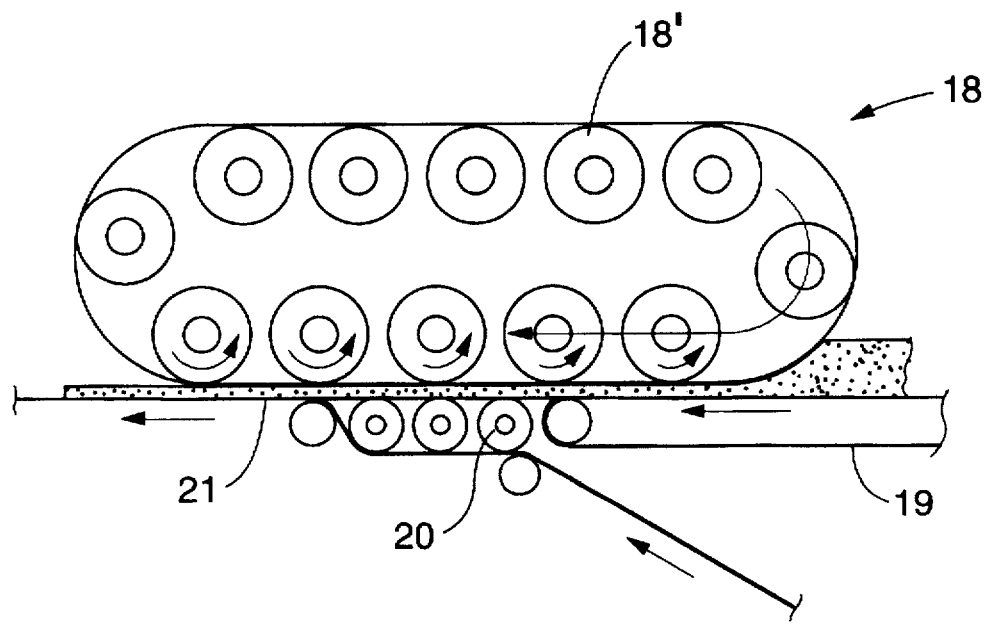
FIG. 4 is a sectional side view of a third embodiment of this invention.

In a third embodiment (shown in FIG. 4), a roller mechanism 18 has an oval orbit along which planetary rollers 18' revolve. Bread dough passing through a space formed between a lower linear portion of the oval orbit and a supply conveyor 19, conveying rollers 20, and discharge conveyor 21, is stretched. The powder sprinkled by a powder-supply device (not shown) onto the discharge conveyor 21 at a position upstream of the rollers 20 adheres to the rollers 20 by making the upper surface of the discharge conveyor 21 abut the lower surfaces of the conveying rollers 20.

Figure 5:
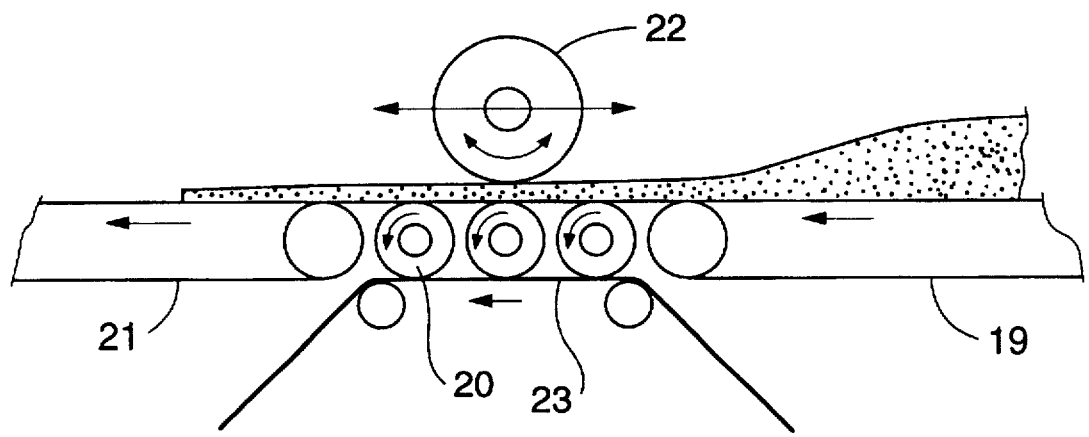
FIG. 5 is a sectional side view of a fourth embodiment of this invention.

In a fourth embodiment (shown in FIG. 5), a stretching roller 22, which reciprocates over a supply conveyor 19, conveying rollers 20, and discharge conveyor 21, is used to replace the planetary rollers in the stretching apparatus of the previous embodiments. In it a separate powder-supply conveyor belt 23 is provided independently of the discharge conveyor 21.

The operations and effects of the embodiments of this invention will now be described.

Bread dough 1, conveyed by the supply conveyor 2, is supplied to the conveying device 3. The supplied bread dough 1 is sandwiched between the rollers 5', 18', 22 and the conveying device 3, is stretched by the conveying rollers, whose rotational speeds increase sequentially, and is discharged by the discharge conveyor 4.

Powder is supplied from the powder-supply means 11 onto the discharge conveyor 4.21 or a powder-supply conveyor 23, so that the supplied powder securely adheres to the lower surfaces of the conveying rollers 31–35, 20, which abut the extended portion 41.21 of the discharge conveyor belt 4.21 or the powder-supply conveyor belt 23. The powder thus adhering to the conveying rollers 31–35.20 then adheres to the bread dough passing thereon by their rotations so that a stretching operation free from adhesion is achieved.

When no powder is supplied to the conveying rollers 31–35.20, the conveying rollers 31–35.20 cannot convey the powder even if some powder is made to adhere to the lower surface of bread dough by sprinkling powder onto the supply conveyor 2,19. Thus, when bread dough 1 is stretched on the conveying rollers 31–35.20, the new surface portions of the bread dough that are not sprinkled with powder appear on its surface so as to adhere to the surface of the conveying rollers when contacting each other. A considerable amount of powder inevitably has been supplied hitherto to avoid such adhesion, causing a deterioration of the quality of stretched dough products.

Since the apparatus of this invention can directly supply powder to the conveying rollers 31–35.20, there is no need to supply an excess amount of powder, so that the total amount of powder to be used can be reduced.

Since the powder-supply conveying belt always contacts the conveying rollers 31–35.20, when dust adheres to the conveying rollers it can be removed by the belt so as to keep their surfaces always clean, and so as to prevent the dough from adhering to the rollers.

As is explained above, the improved powder-supply mechanism of this invention can minimize the needed supply of powder used to stretch bread dough so that the quality of the stretched dough products can be enhanced.

Since in the apparatus of this invention powder can be supplied uniformly to the intermediate conveying rollers, the stretching operation will not be stopped by the adhesion of stretched bread dough to the rollers, so that a long, continuous operation can be made.

What is claimed is:

1. An apparatus for stretching bread dough, comprising:

a conveying device having a first plurality of rollers, an inlet, and an outlet, a second roller mechanism disposed above the first plurality of rollers in such a position that the bread dough is stretched as said bread dough passes between the first plurality of rollers and the second roller mechanism, a powder-supply source 11, a supply conveyor 2 positioned at the inlet of the conveying device, a discharge conveyor having at least a first part positioned at the outlet of the conveying device for receiving the bread dough that has been stretched, and a powder-supply conveyor belt 41 having a portion abutting lower surfaces of the first plurality of rollers, and configured to receive powder from the powder-supply source and to supply the powder to the bread dough being stretched.

2. An apparatus for stretching bread dough of claim 1, wherein the second roller mechanism has an oval orbit along which planetary rollers revolve.

3. An apparatus for stretching bread dough of claim 1, wherein the second roller mechanism is a stretching roller, which reciprocates over the conveying device.

4. The apparatus of claim 1, wherein the powder-supply conveyor belt forms a part of the discharge conveyor.

5. The apparatus of claim 2, wherein the powder-supply conveyor belt forms a part of the discharge conveyor.

6. The apparatus of claim 3, wherein the powder-supply conveyor belt forms a part of the discharge conveyor.

* * * * *